(12) United States Patent
Forwald et al.

(10) Patent No.: US 8,906,243 B2
(45) Date of Patent: Dec. 9, 2014

(54) APPARATUS AND PROCESS FOR TREATMENT FOR IMMISCIBLE LIQUIDS

(75) Inventors: Karl Forwald, Kristiansand (NO); Jesse White, Nodeland (NO)

(73) Assignee: Elkem Solar AS, Kristiansand (NO)

( * ) Notice: Subject to any disclaimer, the term of this patent is extended or adjusted under 35 U.S.C. 154(b) by 761 days.

(21) Appl. No.: 13/143,999

(22) PCT Filed: Nov. 20, 2009

(86) PCT No.: PCT/NO2009/000398
§ 371 (c)(1),
(2), (4) Date: Aug. 9, 2011

(87) PCT Pub. No.: WO2010/082830
PCT Pub. Date: Jul. 22, 2010

(65) Prior Publication Data
US 2011/0293500 A1 Dec. 1, 2011

(30) Foreign Application Priority Data
Jan. 13, 2009 (NO) .................................... 20090195

(51) Int. Cl.
*C22B 9/10* (2006.01)
*C01B 33/037* (2006.01)
*B01J 19/00* (2006.01)

(52) U.S. Cl.
CPC ............... *C22B 9/106* (2013.01); *C01B 33/037* (2013.01)
USPC ......... 210/787; 210/512.1; 422/129; 422/257

(58) Field of Classification Search
USPC ........................ 210/787, 512.1; 422/129, 257
See application file for complete search history.

(56) References Cited

U.S. PATENT DOCUMENTS

| | | | |
|---|---|---|---|
| 2,628,894 | A | 2/1953 | Langmyhr |
| 2,937,079 | A | 5/1960 | Van Pool |
| 2,988,429 | A | 6/1961 | Cooley |
| 3,199,962 | A | 8/1965 | Whitaker |
| 3,254,048 | A | 5/1966 | Schaub et al. |
| 4,009,751 | A | 3/1977 | Zelnik |

FOREIGN PATENT DOCUMENTS

| | | |
|---|---|---|
| EP | 0699625 | 3/1996 |
| RU | 2342971 | 1/2009 |
| SU | 597389 | 3/1978 |
| WO | 03031332 | 4/2003 |

OTHER PUBLICATIONS

International Preliminary Report on Patentability for PCT/NO2009/000398, Apr. 7, 2011.*

* cited by examiner

*Primary Examiner* — David A Reifsnyder
(74) *Attorney, Agent, or Firm* — Lucas & Mercanti, LLP

(57) ABSTRACT

The present invention relates to an apparatus for continuous treatment of two immiscible molten liquids having different densities. The apparatus comprises at least one open-ended helical reaction channel (3) arranged inside a substantially vertical housing (1), means for the continuous supply of the liquid with the higher density to the upper open end of said at least one reaction channel (3) and means for continuous supply of the liquid with the lower density to the lower open end of said at least one helical reaction channel (3), means for continuous removal of the liquid with the higher density at the lower open end of said helical reaction channel and means for removal of the liquid with the lower density from the upper open end of said helical reaction channel (3). The invention further relates to a method for continuous treatment of two immiscible molten liquids having different densities using the apparatus of the present invention.

20 Claims, 7 Drawing Sheets

APPARATUS AND PROCESS FOR TREATMENT FOR IMMISCIBLE LIQUIDS

CROSS REFERENCE TO RELATED APPLICATION

Figure 1:
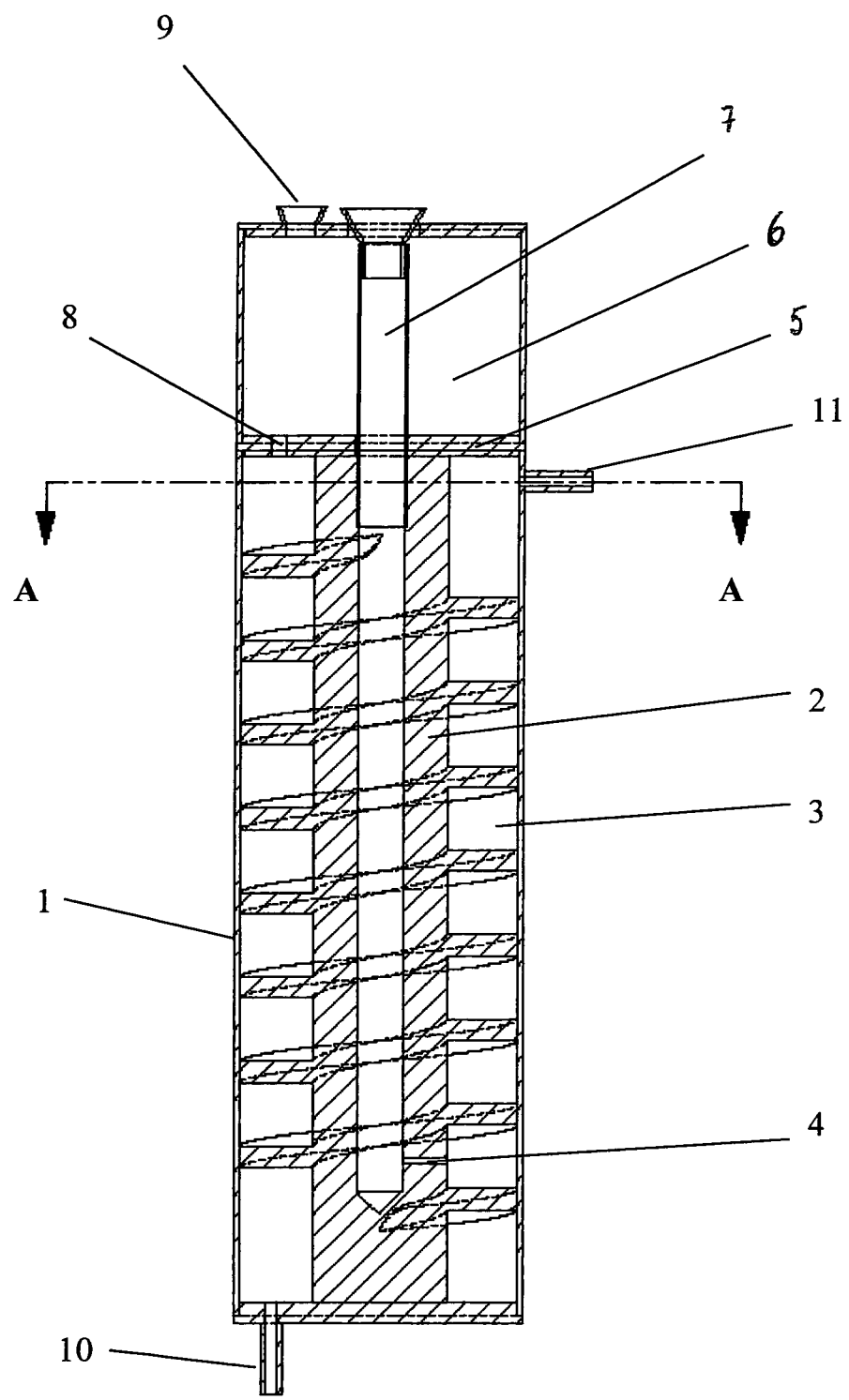

This is a 371 of PCT/NO2009/000398 filed Nov. 20, 2009, which in turn claimed the priority of Norwegian Patent Application No. 2009-0195 filed Jan. 13, 2009, both applications are incorporated by reference herein.

The present invention relates to an apparatus and a method for treatment of two immiscible molten liquids having different densities, and more particularly to an apparatus and a method for treatment of molten metals with oxide melts (slag) or with other ionic melts (molten salts) and for treatment oxide melts with molten salts and vice versa.

BACKGROUND ART

Refining of metals by treatment of molten metal with liquid slag or with molten salt and treatment of molten slag with molten salt are examples of conventional processes where two immiscible molten liquids having different densities are treated.

Conventionally slag treatment of liquid metals is carried out by adding either molten slag or slag forming additives to liquid metal contained in a ladle or the like. The liquid slag and the molten metal are mixed and impurities in the liquid metal are transferred to the slag. After settling the slag is removed from the liquid metal. One important feature with slag treatment is that the slag and the metal must have different densities in order to allow for separation of the slag phase and metal phase.

Treatment of liquid metals with molten salts is carried out in a manner corresponding to slag treatment. Also for treatment of liquid metals with molten salts there must be a difference in the densities of the metal and the salt in order to allow for separation of molten metal phase and molten salt phase.

In some instances liquid slags are treated with molten salts in order to produce a clean slag for later use in slag refining of metals.

In EP-B 699625 it is disclosed a method for removing impurities from molten silicon by slag treatment, particularly to remove boron from molten silicon.

The process according to EP-B 699625 is that slag is continuously or substantially continuously added to molten silicon and that the slag is continuously or substantially continuously inactivated or removed from the silicon melt as soon as equilibrium between the molten slag and molten silicon is reached with respect to the impurity elements to be removed. The process of EP-B 699625 is, however, difficult to carry out in practice, as it is difficult to establish when equilibrium between the molten slag and the molten silicon with respect to the impurities to be removed is reached. Further, inactivation of the slag and full removal of the slag is difficult to carry out in practice.

In EP-B 1441983 it is disclosed an apparatus for continuous slag treatment of molten silicon for removal of one or more impurity elements from the silicon.

The apparatus comprises a vessel for molten silicon and liquid slag having an upwardly extending overflow pipe for slag connected to a slag outlet opening in the bottom of the vessel. An open pipe is arranged about the overflow with is an annulus between the pipe and the overflow. The pipe extends upwards to a level above the top of the overflow and downwards to the bottom of the vessel and the pipe has openings at the bottom of the vessel. A closeable outlet opening for slag treated silicon is arranged in the sidewall of the vessel. In operation a bath of molten silicon is filled into the vessel, and slag is continuously supplied to the top of the silicon bath, sinks through the silicon bath, through the opening in the pipe at the bottom of the vessel and leaves the vessel through the overflow. When sufficient slag has been added, slag and silicon are allowed to rest to allow for separation of silicon and slag whereafter part of the silicon is removed through the closeable opening in the sidewall of the vessel.

Even if the apparatus according to EP-B 1441983 allows for continuous slag addition it is in fact a batch process as molten silicon has to be added and tapped at intervals, and slag addition has to be stopped before and during tapping of slag treated silicon. In addition, the rather complicated design of the apparatus makes it difficult to keep the temperature in the apparatus at the same level causing risk of solidification of silicon or slag in the apparatus.

There is thus need for a true continuous apparatus and method for treatment of two immiscible molten liquids having different densities.

DESCRIPTION OF INVENTION

The present invention thus relates to an apparatus for continuous treatment of two immiscible molten liquids having different densities, where the apparatus comprises at least one open-ended helical reaction channel arranged inside a substantially vertical housing, means for the continuous supply of the liquid with the higher density to the upper open end of said at least one reaction channel and means for continuous supply of the liquid with the lower density to the lower open end of said at least one helical reaction channel, means for continuous removal of the liquid with the higher density at the lower open end of said helical reaction channel and means for removal of the liquid with the lower density from the upper open end of said helical reaction channel.

According to a preferred embodiment the apparatus further comprises a vertical tube centrally arranged in the housing inside the open core of the at least one helical reaction channel where the tube extends from a distance below the upper end of the housing but above the upper end of the at least one vertical reaction channel and to the bottom of the housing and a horizontal plate arranged on the top of the tube covering the cross-section of the housing creating a chamber in the housing above the horizontal plate.

The means for supplying the liquid with the higher density to the upper open end of the at least one helical reaction channel preferably comprises a supply opening for the liquid to the chamber in the housing above the horizontal plate, and at least one opening in the horizontal plate.

Alternatively the means for supplying the liquid with the higher density to the upper open end of the at least one helical reaction channel comprises a pipe extending from a source of molten liquid with the higher density arranged on the outside the housing and into the housing near the upper open end of the at least one helical reaction channel.

The means for supplying the liquid with the lower density preferably comprises a vertical feeding pipe extending from above the housing, through an opening in the horizontal plate and down into the centrally arranged tube and out through an opening in the tube near the lower end of the tube.

Alternatively the means for supplying the liquid with the lower density to the lower open end of the at least one helical reaction channel comprises a pipe extending from the outside of the housing and to the lower open end of the at least one helical reaction channel.

The means for removing the liquid with the higher density from the bottom of the housing preferably comprises an opening in the bottom of the housing.

According to another embodiment the means for removing the liquid with the higher density from the bottom of the housing comprises a pipe running from the bottom of the housing, upwards to a level just below the upper open end of the helical reaction channel and down through the bottom of the housing.

The means for removing the liquid with the lower density preferably comprises an outlet opening arranged in the sidewall of the housing at a level below the horizontal plate and above the upper open end of the at least one helical reaction channel.

According to another embodiment the means for removing the liquid with the lower density comprises a vertical open-ended pipe running from a level below the horizontal plate and above the upper open end of the helical reaction channel and down through the bottom of the housing.

The helical reaction channels can have any suitable cross-section such as circular, oval, square etc., but the cross-section is preferably rectangular. The inclination of the helical reaction channels is preferably between 2 and 20° and more preferably between 4 and 10°.

Preferably four helical reaction channels are arranged in the housing.

In order to increase the contact time between the two liquids, two apparatus according to the invention can be connected in series, either one on the top of the other or one next to the other. The liquid with the higher density is in this configuration removed from the lower open end of the at least one helical reaction channel in the first apparatus and supplied to the upper open end of the at least one helical reaction channel in the second apparatus and the liquid with the lower density is removed from the upper open end of the at least one helical reaction channels in the first apparatus and supplied to the lower open end of the at least one helical reaction channel in the second apparatus.

According to a second aspect the present invention relates to a method for continuous treatment of two immiscible liquids having different densities, where the liquid with the higher density is continuously supplied to the upper end of at least one helical reaction chamber arranged inside a vertical cylindrical housing, continuously supplying the liquid with the lower density to the lower end of the at least one helical reaction channel, whereby the liquid with the higher density and the liquid with lower density flow in opposite directions through the at least one helical reaction channel, continuously removing the liquid with the higher density from the lower open end of the at least one helical reaction channel and continuously removing the liquid with the lower density from the upper open end of the at least one helical reaction channel.

According to a preferred embodiment of the method according to the present invention the liquid with the lower density is molten silicon and the liquid with the higher density is calcium-silicate slag.

By the apparatus and the method according to the present invention a true continuous countercurrent treatment of molten metal with a slag or with a molten salt and treatment of a liquid slag with a molten salt is obtained.

Due to density differences between the liquids the liquid with the higher density will flow downwards in the at least one helical reaction channel and the liquid with the lower density will flow upwards in the at least one helical reaction channel. The flow rate for a particular metal and slag or salt system or for a particular slag and salt system will depend on the viscosity ratio of the two liquids, the density difference, the interfacial tension and inclination of the helical reaction channels.

With the apparatus and method according to the present invention there will be a good interaction between the two liquids as they are flowing in opposite directions in the helical reaction channels thereby providing sufficient time for impurities to remove from the liquid metal to the slag or to the molten salt.

The apparatus according to the invention further has the advantage that it has no movable parts.

It should be appreciated that the molten metal in some instances has a higher density than the slag or the salt melt and in other instances the molten metal has a lower density than the slag or the salt melt.

SHORT DESCRIPTION OF THE DRAWINGS

Figure 2:
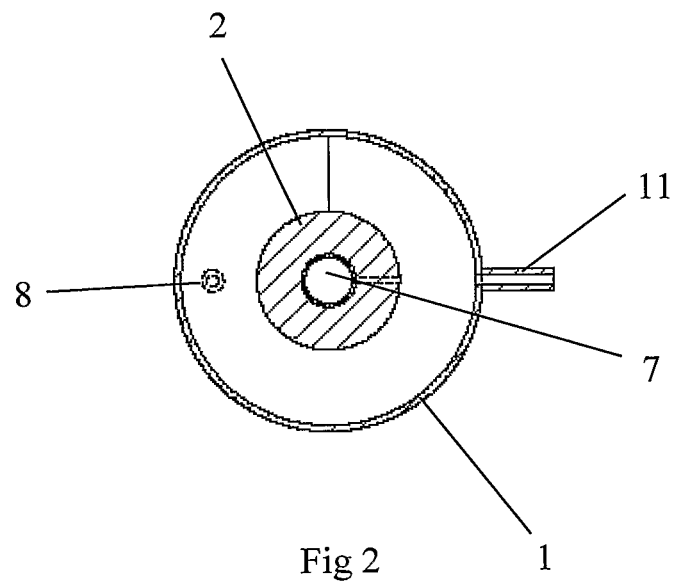
Figure 3:
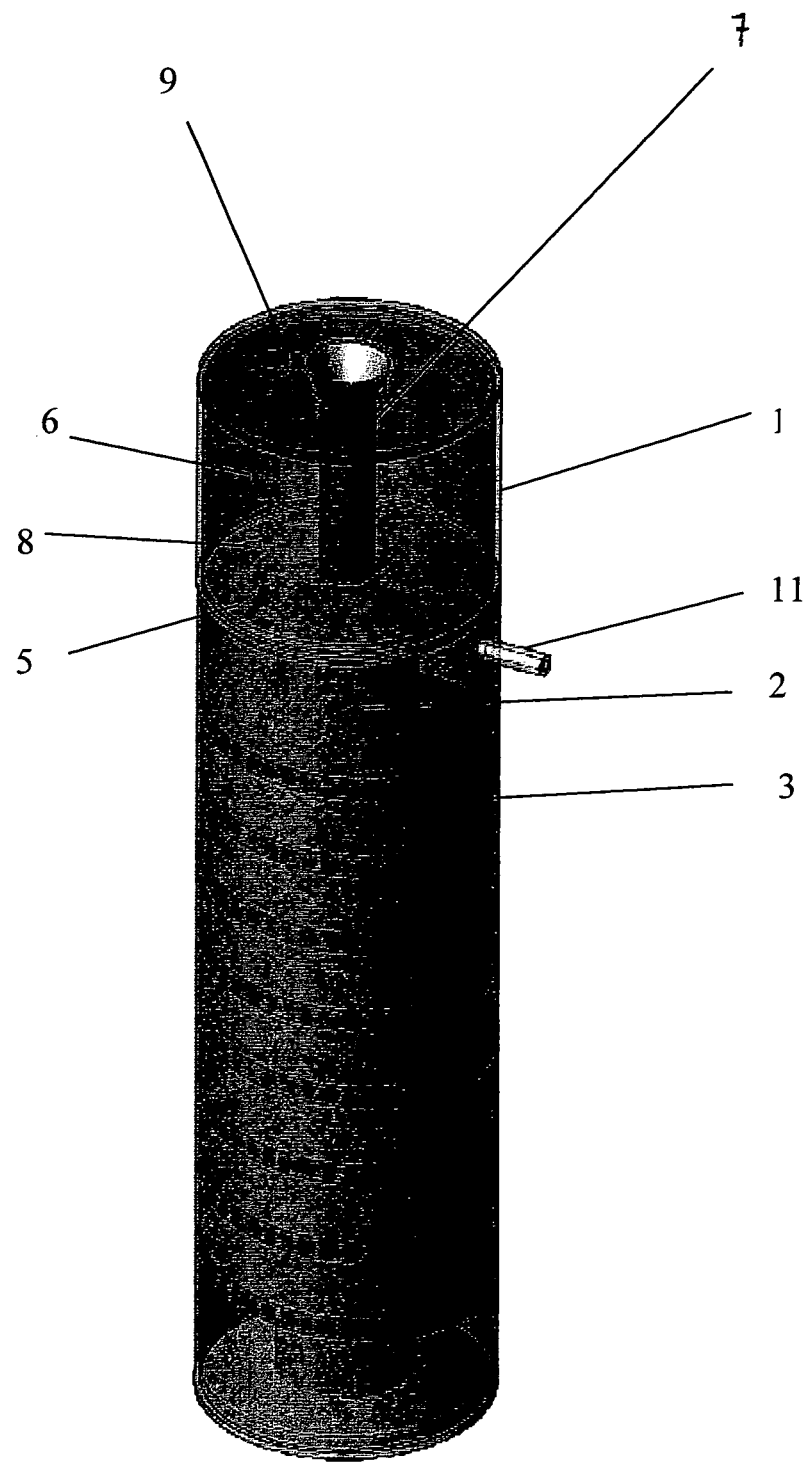
Figure 4:
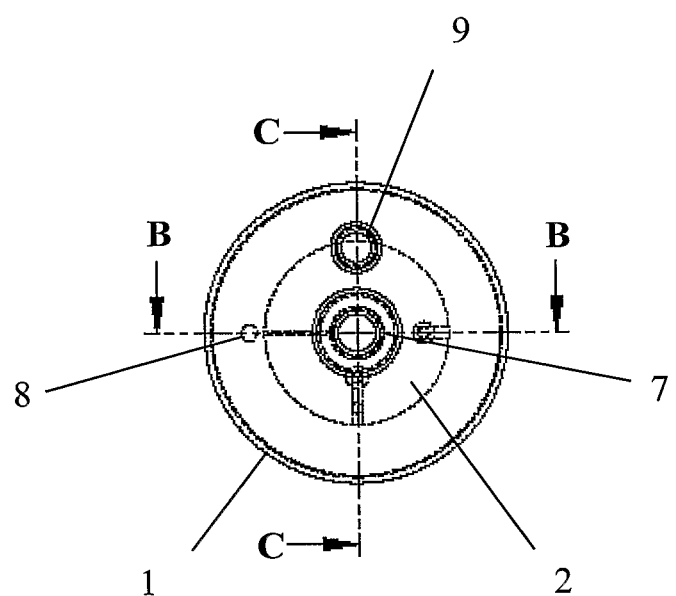
Figure 5:
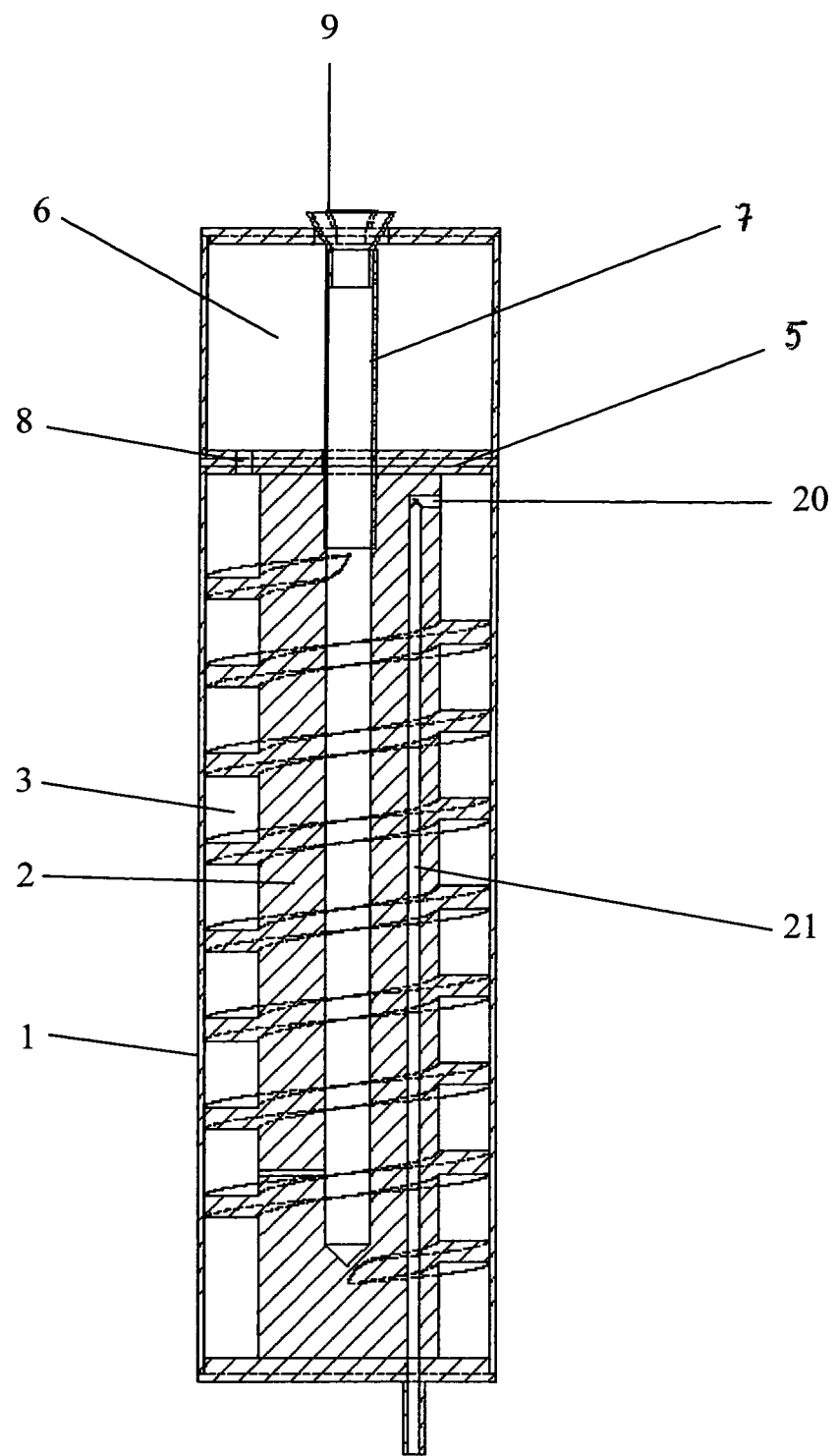
Figure 6:
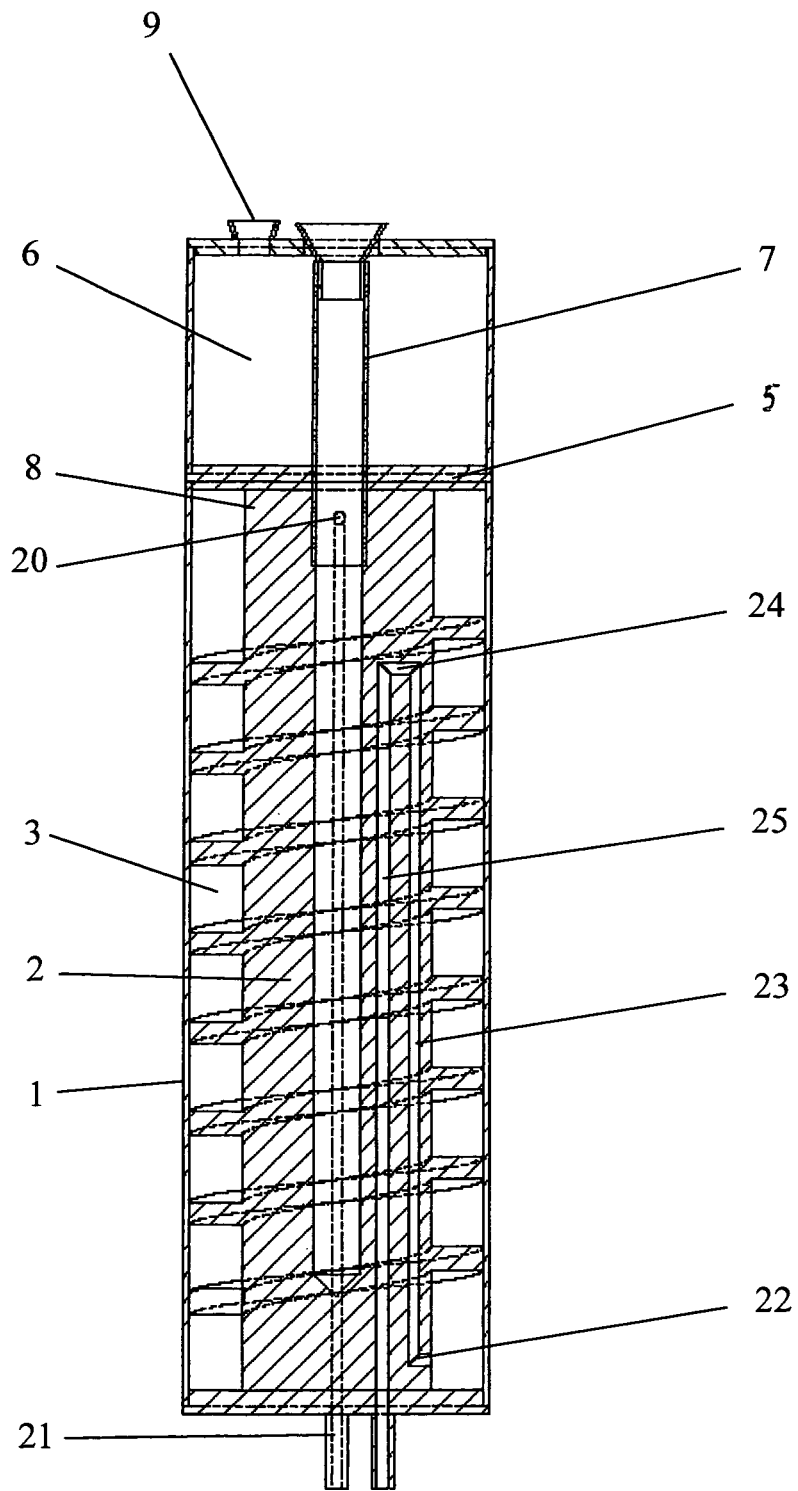
Figure 7:
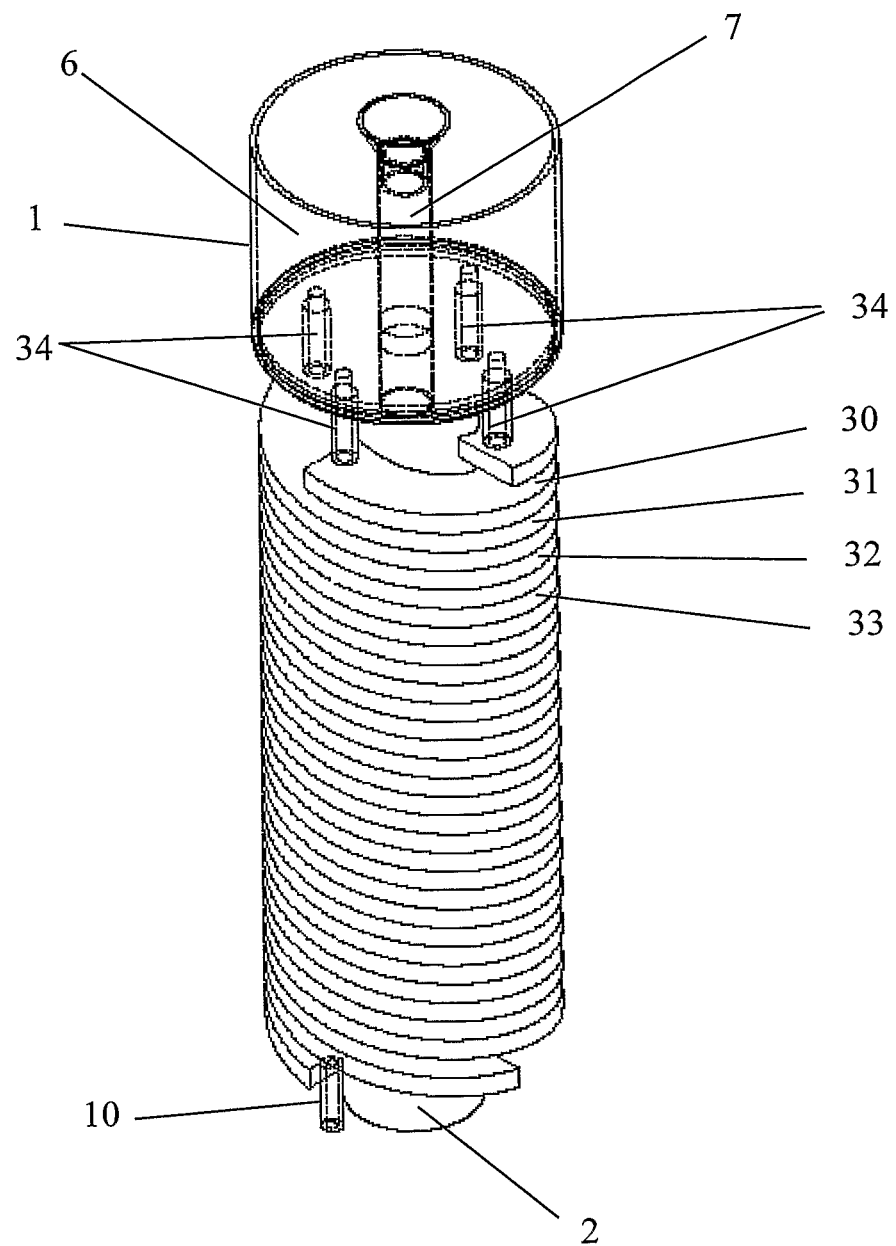

FIG. 1 shows a cross-section through a preferred embodiment of an apparatus according to the present invention, FIG. 2 shows a cross-section along line A-A in FIG. 1, FIG. 3 shows a perspective view of the apparatus of FIG. 1, FIG. 4 shows a top view similar to the embodiment shown in FIGS. 1-3, but with different means for removal of the liquid with the higher density and the liquid with the lower density, FIG. 5 shows a cross-section along B-B in FIG. 4, FIG. 6 shows a cross-section along C-C in FIG. 4, and FIG. 7 shows a second embodiment of the apparatus according to the present invention comprising four helical reaction channels.

DETAILED DESCRIPTION OF THE DRAWINGS

As can be seen from FIGS. 1, 2 and 3, the apparatus according to one embodiment of the present invention comprises a generally cylindrical outer housing 1. In the housing 1 there is a centrally arranged tube 2 extending to the bottom of the housing 1. Between the inner wall of the housing 1 and the outside of the tube 2 there is arranged a helical reaction channel 3 running from the upper part of the housing 1 to the lower part of the housing 1. The helical reaction channel 3 can have any suitable cross-section such as circular, oval or square cross-section, but preferably the cross-section is rectangular and typically 60-120 mm wide and 20-40 mm high. The inclination of the helical reaction channel 3 can vary but is preferably between 2 and 20° and more preferably between 4 and 10°. The helical reaction channel 3 is open at the upper end and at its lower end.

The tube 2 has an opening 4 in the sidewall at its lower end at the same level as the lower end of the helical reactor channel 3.

Above the upper end of the helical reaction channel 3, but at a distance below the top of the housing 1, there is arranged a horizontal plate 5 affixed to the inner walls of the housing 1. The plate 5 rests on the top of the tube 2 and forms a chamber 6 in the housing 1 above the horizontal plate 5. The tube 2 has a central opening through which a vertical supply pipe 7 extends from above the housing 1 through the chamber and the horizontal plate 5 and down into the tube 2 for supply of a first liquid with low density to the tube 2. The horizontal plate 5 further has an opening 8 on the outside of the tube 2. A supply opening 9 for supply of a second liquid having a higher density than the first liquid to the chamber 6 is arranged at the top of the housing 1. An outlet opening 10 for discharge of the second liquid is arranged in the bottom of the housing 1.

Finally a discharge opening 11 for the first liquid is arranged in the sidewall of the housing 1 at a vertical level below the horizontal plate 5, but above the upper end of the helical reaction channel 3.

The apparatus is preferably heated from the outside by means of conventional heating means, such as electrical resistance heating panels or an induction heating coil.

The operation of the apparatus described above will now be described for the case where the first liquid is molten silicon and the second liquid having a higher density than the first liquid is calcium-silicate slag. This is a slag refining process for removing impurities, particularly boron from molten silicon.

In order to start the slag refining process the reaction channel 3 is first filled with liquid slag supplied through the supply opening 9, the opening 8 in the horizontal plate 5 and into the upper end of the helical reaction channel 3. When the helical reaction channel 3 is filled with slag, slag will discharge is through the outlet opening 10. At this time molten silicon is continuously supplied through the supply pipe 7, into the tube 2 while the supply of liquid slag is continued. The silicon will flow out through the opening 4 in the lower end of the tube 2 and to the lower open end of the helical reaction channel 3. Due to the difference in density between liquid slag and molten silicon creating buoyancy forces, molten silicon will start to flow upwards in the helical reaction channel 3 through the downward flowing slag, thus creating a contact surface between the silicon and the molten slag.

Slag treated silicon will eventually start to continuously flow out of the upper open end of the helical reactor channel and is discharged in the sidewall of the housing 1 through the outlet opening 11 in the housing 1.

A steady state situation will be established and silicon and slag will move in opposite directions in the helical reaction channel 3 as long as the supply of molten silicon and liquid slag is maintained.

The driving force for the flow of the two liquids in the helical reaction channel 3 is provided by gravitational force. Flow resistance is mainly caused by melt viscosity, interfacial tension and narrow annular flow paths.

In the apparatus and the process of the present invention there is a counter-current flow of slag and metal. Fresh slag will meet the most pure silicon in upper part of the helical reaction channel 3 and slag that has an increased content of impurities from the silicon will meet the untreated silicon in the lower part of the helical reaction channel 3. The slag and silicon will be in contact with the slag throughout the whole length of the helical reaction channel 3 thus providing optimum interaction between slag and silicon. Optimum conditions for slag refining is thereby provided.

In FIGS. 4-6 there is shown an embodiment of the apparatus similar to the embodiment shown in FIGS. 1-3. The only difference between the embodiment shown in FIGS. 4-6 and the embodiment shown in FIGS. 1-3 is the means for removal of the two liquids from the housing 1. Parts in FIGS. 4-6 corresponding to identical parts on FIGS. 1-3 have identical reference numerals.

In FIGS. 4 and 5 the means for removing the liquid having the lower density comprises a substantially horizontal channel 20 from the housing 1 into the wall of the tube 2 at a vertical level below the horizontal plate 5, but above the upper end of the helical reaction channel 3 and a vertical pipe 21 in the sidewall of the tube 2 from the channel 20 and down through the bottom of the housing 1. As an alternative the vertical pipe 21 may be arranged inside the tube 2.

In FIGS. 4 and 6 the means for removing the liquid with the higher density comprises a substantially horizontal channel 22 in the wall of the tube 2 near the bottom of the housing 1, a vertical pipe 23 inside the wall of the tube 2 extending up to a level just below the upper inlet end of the helical reaction channel 3, a horizontal pipe 24 in the wall of the tube 2 and another vertical pipe 25 in the wall of the tube 2 running down trough the bottom of the housing 1.

By the alternative means for removing of the two liquids shown in FIGS. 4-6, the flow of the two liquids in the helical reaction channel can be controlled more easily.

In FIG. 7 there is shown a second embodiment of the apparatus according to the present invention. This embodiment differs from the embodiment shown in FIGS. 1-3 in that four helical reaction channels 30, 31, 32, 33 are arranged in the housing with four separate pipes 34 for supply of heavy liquid from the chamber 6 to each of the four helical reaction channels 30, 31, 32, 33 and where the central tube 2 for supply of light liquid has four openings (not shown) near its bottom for supply of light liquid to the lower ends of each of the four helical reaction channels. This embodiment increases the capacity of the apparatus by a factor of four compared to the embodiment shown in FIGS. 1-3.

The apparatus can be made of any suitable materials which are resistant to the metals, slag or salt melt in question and which can withstand the operating temperature.

The invention claimed is:

1. An apparatus for continuous treatment of two immiscible molten liquids having different densities comprising:
    a substantially vertical elongated housing;
    at least one open-ended helical reaction channel having an open core arranged inside the housing;
    a vertical tube centrally arranged inside the open core of the at least one helical reaction channel, the vertical tube extends from a distance below an upper end of the housing, but above the upper end of the at least one helical reaction channel, to a bottom end of the housing;
    means for continuous supply of a liquid having higher density of the two immiscible molten liquids to an upper open end of the at least one helical reaction channel;
    means for continuous supply of a liquid having lower density of the two immiscible molten liquids to a lower open end of the at least one helical reaction channel;
    means for continuous removal of the liquid having higher density at the lower open end of the at least one helical reaction channel; and
    means for continuous removal of the liquid having lower density from the upper open end of the at least one helical reaction channel.

2. Apparatus according to claim 1, further comprising a horizontal plate arranged on top of the vertical tube and covering a cross-section of the housing creating a chamber in the housing above the horizontal plate.

3. The apparatus according to claim 2, wherein the means for supplying the liquid having higher density to the upper open end of the at least one helical reaction channel comprises a supply opening for the liquid having higher density to the chamber in the housing above the horizontal plate, and at least one opening in the horizontal plate.

4. The apparatus according to claim 1, wherein the means for supplying the liquid having higher density to the upper open end of the at least one helical reaction channel comprises a pipe extending from a source of the liquid having higher density arranged on the outside of the housing and into the housing near the upper open end of the at least one helical reaction channel.

5. The apparatus according to claim 1, wherein the means for supplying the liquid having lower density comprises a vertical feeding pipe extending from above the housing, through an opening in the horizontal plate and down into the centrally arranged vertical tube and out through an opening in the vertical tube near a lower end of the vertical tube.

6. The apparatus according to claim 1, wherein the means for supplying the liquid having lower density to the lower open end of the at least one helical reaction channel comprises a pipe extending from outside of the housing to the lower open end of the at least one helical reaction channel.

7. The apparatus according to claim 1, wherein the means for removing the liquid having higher density from the bottom end of the housing comprises an opening in the bottom of the housing.

8. The apparatus according to claim 1, wherein the means for removing the liquid having higher density from the bottom of the housing comprises a pipe running from the bottom of the housing, upwards to a level below the upper open end of the at least one helical reaction channel and down through the bottom of the housing.

9. The apparatus according to claim 1, wherein the means for removing the liquid having lower density comprises an outlet opening arranged in a sidewall of the housing at a level below the horizontal plate and above the upper open end of the at least one helical reaction channel.

10. The apparatus according to claim 1, wherein the means for removing the liquid having lower density comprises a vertical open-ended pipe running from a level below the horizontal plate and above the upper open end of the at least one helical reaction channel and down through the bottom of the housing.

11. The apparatus according to claim 1, wherein the at least one helical reaction channel has a rectangular cross-section.

12. The apparatus according to claim 11, wherein the cross section of the at least one helical reaction channel is between 60 and 120 mm wide and between 20 and 40 mm high.

13. The apparatus according to claim 1, wherein the inclination of the at least one helical reaction channel is between 2 and 20°.

14. The apparatus according to claim 13, wherein the inclination of the at least one helical reaction channel is between 4 and 10°.

15. The apparatus according to claim 1, wherein four helical reaction channels are arranged in the housing.

16. The apparatus according to claim 1, wherein two apparatuses are connected in series.

17. The apparatus according to claim 16, wherein the two apparatuses are arranged one on top of the other.

18. The apparatus according to claim 16, wherein the two apparatuses are arranged next to each other.

19. A method for continuous treatment of two immiscible molten liquids having different densities comprising:

continuously supplying a liquid having higher density of the two immiscible molten liquids to an upper open end of at least one helical reaction channel having an open core arranged inside a substantially vertical elongated housing; a vertical tube centrally arranged in the housing inside the open core of the at least one helical reaction channel, continuously supplying a liquid having lower density of the two immiscible molten liquids to a lower open end of the at least one open-ended helical reaction channel, whereby the liquid having higher density and the liquid having lower density flow in opposite directions through the at least one helical reaction channel, continuously removing the liquid having higher density from the lower open end of the at least one helical reaction channel, and continuously removing the liquid having lower density from an upper open end of the at least one helical reaction channel, wherein the vertical tube extends from a distance below an upper end of the housing, but above the upper end of the at least one helical reaction channel to a bottom end of the substantially vertical cylindrical housing.

20. The method according to claim 19, wherein the liquid having lower density is molten silicon and the liquid having higher density is calcium-silicate slag.

* * * * *